United States Patent
Klinghofer et al.

(10) Patent No.: US 10,243,985 B2
(45) Date of Patent: Mar. 26, 2019

(54) SYSTEM AND METHODS THEREOF FOR MONITORING AND PREVENTING SECURITY INCIDENTS IN A COMPUTERIZED ENVIRONMENT

(71) Applicant: Hexadite Ltd., Tel Aviv (IL)

(72) Inventors: Barak Klinghofer, Tel Aviv (IL); Idan Levin, Ramat Hasharon (IL)

(73) Assignee: Hexadite LTD., Tel Aviv (IL)

( * ) Notice: Subject to any disclaimer, the term of this patent is extended or adjusted under 35 U.S.C. 154(b) by 0 days.

(21) Appl. No.: 14/729,717

(22) Filed: Jun. 3, 2015

(65) Prior Publication Data
US 2015/0350236 A1    Dec. 3, 2015

Related U.S. Application Data

(60) Provisional application No. 62/006,905, filed on Jun. 3, 2014.

(51) Int. Cl.
| | |
|---|---|
| *H04L 29/06* | (2006.01) |
| *G06F 21/57* | (2013.01) |
| *G06F 21/56* | (2013.01) |
| *G06F 21/55* | (2013.01) |

(52) U.S. Cl.
CPC ........ *H04L 63/1433* (2013.01); *G06F 21/552* (2013.01); *G06F 21/566* (2013.01); *G06F 21/577* (2013.01); *H04L 63/02* (2013.01); *G06F 2221/034* (2013.01)

(58) Field of Classification Search
CPC .... G06F 21/552; G06F 21/566; G06F 21/577; G06F 2221/034; H04L 63/02; H04L 63/1433
See application file for complete search history.

(56) References Cited

U.S. PATENT DOCUMENTS

| | | | |
|---|---|---|---|
| 7,640,235 B2 | 12/2009 | Shulman et al. |
| 7,743,420 B2 | 6/2010 | Shulman et al. |
| 7,752,662 B2 | 7/2010 | Shulman et al. |
| 7,861,303 B2 | 12/2010 | Kouznetsov et al. |
| 8,024,804 B2 | 9/2011 | Shulman et al. |
| 8,051,484 B2 | 11/2011 | Shulman et al. |
| 8,056,141 B2 | 11/2011 | Shulman et al. |
| 8,108,933 B2 | 1/2012 | Mahaffey |

(Continued)

*Primary Examiner* — Oleg Korsak
(74) *Attorney, Agent, or Firm* — Fiala & Weaver P.L.L.C.

(57) ABSTRACT

A system detects and handles security incidents in a computerized environment. The system collects metadata respective of one or more user devices communicatively coupled in the computerized environment. Respective of the collected metadata, the system generates expected behavior patterns of the user devices within the computerized environment. The system continuously monitors the actual behavior of the user devices. Upon detection of deviations from the expected behavior patterns, the system sends a terminable agent to the user device in which the deviation was detected. The system then receives from the terminable agent metadata respective of the deviation. Upon determination that the deviation is a security incident respective of the metadata, the system configures the terminable agent to initiate actions respective thereto. The type of actions required is determined respective of the metadata received from the terminable agent. Upon removal of the security incident, the agent may be terminated.

20 Claims, 2 Drawing Sheets

(56) References Cited

U.S. PATENT DOCUMENTS

| | | |
|---|---|---|
| 8,135,948 B2 | 3/2012 | Shulman et al. |
| 8,181,246 B2 | 5/2012 | Shulman et al. |
| 8,321,437 B2 * | 11/2012 | Lim .................... G06F 17/3089 |
| | | 707/758 |
| 2003/0079145 A1 | 4/2003 | Kouznetsov et al. |
| 2003/0229801 A1 | 12/2003 | Kouznetsov et al. |
| 2003/0233566 A1 | 12/2003 | Kouznetsov et al. |
| 2003/0233574 A1 | 12/2003 | Kouznetsov et al. |
| 2005/0120054 A1 | 6/2005 | Shulman et al. |
| 2007/0174630 A1 | 7/2007 | Shannon et al. |
| 2007/0240218 A1 | 10/2007 | Tuvell et al. |
| 2007/0240220 A1 | 10/2007 | Tuvell et al. |
| 2007/0240221 A1 | 10/2007 | Tuvell et al. |
| 2007/0240222 A1 | 10/2007 | Tuvell et al. |
| 2008/0086773 A1 | 4/2008 | Tuvell et al. |
| 2008/0196104 A1 | 8/2008 | Tuvell et al. |
| 2009/0144823 A1 | 6/2009 | Lamastra et al. |
| 2010/0011029 A1 | 1/2010 | Niemela |
| 2010/0251000 A1 * | 9/2010 | Lyne ....................... G06F 21/56 |
| | | 714/2 |
| 2011/0179484 A1 | 7/2011 | Tuvell et al. |
| 2011/0314542 A1 | 12/2011 | Viswanathan et al. |
| 2011/0314548 A1 | 12/2011 | Yoo |
| 2012/0023584 A1 | 1/2012 | Yoo |
| 2012/0042375 A1 | 2/2012 | Yoo |
| 2012/0209983 A1 * | 8/2012 | Bronner ................ G06F 9/4843 |
| | | 709/224 |
| 2012/0036572 A1 | 12/2012 | Yoo |

\* cited by examiner

SYSTEM AND METHODS THEREOF FOR MONITORING AND PREVENTING SECURITY INCIDENTS IN A COMPUTERIZED ENVIRONMENT

CROSS-REFERENCE TO RELATED APPLICATION

This patent application claims priority to U.S. Provisional Patent Application No. 62/006,905, filed Jun. 3, 2014, entitled "A System and Method Thereof for Monitoring and Preventing Security Incidents In a Computerized Environment", which is hereby incorporated by reference in its entirety.

BACKGROUND

Technical Field

One or more exemplary embodiments generally relate to data security, and more specifically, to a system and methods for detection and prevention of security incidents in a computerized environment.

Description of the Related Art

Nowadays, as organizations and enterprises increase in size, they are increasingly more susceptible to malicious attack.

In order to identify such attacks, a number of different anti-virus applications are currently available. These applications must be deployed into a computerized environment and are supposed to terminate malicious activity within the network. These applications are typically used for managing the data and communication. Other solutions are commonly known anti-virus solutions that detects and remove known viruses by identifying "signatures" including characteristic behaviors of viruses. Other solutions known in the art only provide threat detection and do not provide any mitigation process. The majority of these solutions rely upon a basic engine that searches suspect files for the presence of predetermined virus signatures.

SUMMARY

All these related art solutions for preventing security incidents have not been sufficiently effective. In the view of the shortcoming of related art approaches it would be advantageous to provide an efficient solution for detecting and preventing security incidents in a computerized environment. It would be further advantageous if such a solution can be adaptive respective of the type of the computerized environment.

Exemplary embodiments overcome the above disadvantages and other disadvantages not described above. Also, an exemplary embodiment is not required to overcome the disadvantages described above, and an exemplary embodiment of the present inventive concept may not overcome any of the problems described above.

The foregoing and/or exemplary embodiments may be achieved by a method of generating a response to a security incident occurring in a computerized environment that comprises one or more user devices, the method including generating, by a computerized device, at least one terminable agent upon detection of at least one deviation from an expected behavior of at least one of the one or more user devices; sending, by the computerized device, the at least one terminable agent to the at least one user device in which the at least one deviation is detected; configuring the at least one terminable agent to send metadata respective of the at least one deviation; determining, by the computerized device, whether the at least one deviation is a security incident respective of the metadata; configuring, by the computerized device, the at least one terminable agent to initiate at least one action upon determination that the at least one deviation is a security incident; and terminating, by the computerized device, the at least one terminable agent upon determination that the security incident is cleared.

The method may further include detecting the at least one deviation from the expected behavior of at least one of the one or more user devices, the detecting including receiving, by the computerized device, at least one notification of the at least one deviation from the expected behavior of at least one of the one or more user devices.

The method may further include detecting the at least one deviation from the expected behavior of at least one of the one or more user devices, the detecting including collecting, by the computerized device, metadata respective of behavior patterns of the one or more user devices; and generating, by the computerized device, expected behavior patterns of each of the one or more user devices.

The configuring the at least one terminable agent to initiate at least one action upon determination that the at least one deviation is a security incident includes configuring the at least one terminable agent to perform at least one of: terminating a process in the at least one user device, removing content from the at least one user device, redirecting network connectivity, generating a firewall protection, blocking a host connection, and executing a cleaning and detection tool.

The foregoing and/or exemplary embodiments may be achieved by an apparatus for generating a response to a security incident occurring in a computerized environment that comprises one or more user devices, the system including one or more processors and memory storing executable instructions that, when executed by the one or more processors, causes the one or more processors to: generate at least one terminable agent upon detection of at least one deviation from an expected behavior of at least one of the one or more user devices; send the at least one terminable agent to the at least one user device in which the at least one deviation is detected; configure the at least one terminable agent to send metadata respective of the at least one deviation; determine whether the at least one deviation is a security incident respective of the metadata; configure the at least one terminable agent to initiate at least one action upon determination that the at least one deviation is a security incident; and terminate the terminable agent upon determination that the security incident is cleared.

The memory may store further executable instructions that, when executed by the one or more processors, causes the one or more processors to: detect the at least one deviation from the expected behavior of at least one of the one or more user devices by receiving at least one notification of the at least one deviation from the expected behavior of at least one of the one or more user devices.

The memory may store further executable instructions that, when executed by the one or more processors, causes the one or more processors to: detect the at least one deviation from the expected behavior of at least one of the one or more user devices by collecting, by the computerized device, metadata respective of behavior patterns of the one or more user devices; and generating, by the computerized device, expected behavior patterns of each of the one or more user devices.

The foregoing and/or exemplary embodiments may be achieved by a non-transitory computer readable storage medium storing a program for executing a method of generating a response to a security incident occurring in a computerized environment that comprises one or more user devices, the method including: generating, by a computerized device, at least one terminable agent upon detection of at least one deviation from an expected behavior of at least one of the one or more user devices; sending, by the computerized device, the at least one terminable agent to the at least one user device in which the at least one deviation is detected; configuring the at least one terminable agent to send metadata respective of the at least one deviation; determining, by the computerized device, whether the at least one deviation is a security incident respective of the metadata; configuring, by the computerized device, the at least one terminable agent to initiate at least one action upon determination that the at least one deviation is a security incident; and terminating, by the computerized device, the at least one terminable agent upon determination that the security incident is cleared.

BRIEF DESCRIPTION OF THE DRAWINGS

The foregoing and other objects, features, and advantages of the invention will be apparent from the following detailed description taken in conjunction with the accompanying drawings in which.

DETAILED DESCRIPTION OF THE INVENTION

Figure 1:
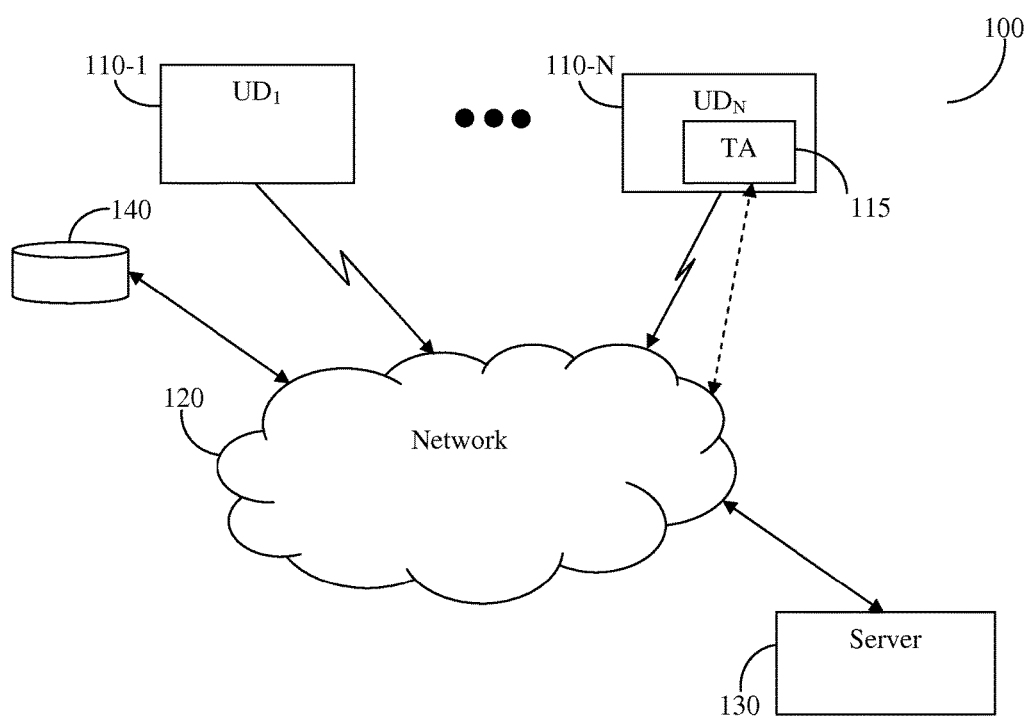
FIG. 1 is a block diagram of a network system used to describe the operation of an apparatus according to an exemplary embodiment.

Below, exemplary embodiments will be described in detail with reference to accompanying drawings so as to be easily realized by a person having ordinary skill in the art. The exemplary embodiments may be embodied in various forms without being limited to the exemplary embodiments set forth herein. Descriptions of well-known parts are omitted for clarity, and like reference numerals refer to like elements throughout.

It is important to note that the embodiments disclosed herein are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

In a non-limiting embodiment, a system detects and handles security incidents in a computerized environment. The system collects metadata respective of one or more user devices communicatively coupled in the computerized environment. Respective of the collected metadata, the system generates expected behavior patterns of the user devices within the computerized environment. The system continuously monitors the actual behavior of the user devices.

Upon detection of deviations from the expected behavior patterns, the system sends a terminable agent to the user device in which the deviation was detected. The system then receives from the terminable agent metadata respective of the deviation. Upon determination that the deviation is a security incident respective of the metadata the system configures the terminable agent to initiate actions respective thereto. The type of actions required is determined respective of the metadata received from the terminable agent. Upon removal of the security incident, the agent may be terminated.

FIG. 1 depicts an exemplary and non-limiting block diagram used to describe the operation of the system 100 according to an exemplary embodiment. One or more user devices (UD) 110-1 through 110-N (collectively referred hereinafter as user devices 110 or individually as a user device 110, merely for simplicity purposes), where N is an integer equal to or greater than 1, are communicatively connected to a network 120. The one or more user devices 110-1 through 110-N can be, but are not limited to smart phone, mobile phones, laptops, tablet computers, wearable computing devices, personal computers (PCs), smart televisions and the like. The network 120 may comprise the likes of busses, local area network (LAN), wide area network (WAN), metro area network (MAN), the worldwide web (WWW), the Internet, as well as a variety of other communication networks, whether wired or wireless, and in any combination, that enable the transfer of data between the different elements of the system 100.

A server 130 is further connected to the network 120. The server 130 is configured to collect metadata respective of the behavior patterns of the user devices 110. The metadata may include, for example, but not by way of limitation, bandwidth consumption of the one or more user devices 110, data related to uses of the user devices 110, content stored within a memory of the user devices 110, data related to the operation and/or processing of the user devices 110, data related to users of the user devices 110, data related to an operating systems of the user devices, user permissions, threat information, etc. Metadata related to content may be related, for example, to the operation of application software programs executed on the user devices 110. Respective of the collected metadata, the server 130 is configured to generate expected behavior patterns for the user devices 110. The expected behavior patterns further include the expected behavior of the user devices 110 within the network 120 as well as the behavior of the user devices and the network 120 as part of a computerized environment of, for example, an enterprise. The server 130 then monitors the behavior of the user devices 110. Upon determination of a deviation from the expected behavior pattern of at least one user device 110, the server 130 is configured to generate a terminable agent (TA) 115 respective thereto. A deviation may be, for example, but not by way of limitation, a suspicious file installed on a user device 110, a suspicious activity within the network 120, abnormal network consumption, abnormal memory activity, unauthorized access to content, etc.

According to another exemplary embodiment, the server 130 receives one or more notifications respective a deviation from a behavior pattern, from, for example, a detection system (not shown) communicatively coupled to the server 130 over the network 120. The detection system may be, for example, an intrusion prevention system (IPS), a data leakage prevention (DLP) system, etc.

The TA 115 is then sent to the source in which the deviation identified, for example, the user device 110-N. According to another exemplary embodiment, the TA 115 may be sent to a source from which additional metadata is required in order to generate an expected behavior pattern and/or identify deviation therefrom. The TA 115 is self-contained, thereby does not require configurations from the designated user device 110-N. According to one exemplary embodiment, the TA 115 works in the background of the user device 110-N and is therefore hidden to users of the user device 110-N. The TA 115 is configured by the server 130 to send metadata respective of the deviation. The metadata received by the TA 115 respective of the deviation enables the server 130 to determine whether the deviation is a security incident. Upon determination that the deviation is a security incident, the server 130 configures the TA 115 to initiate one or more actions respective thereto. The actions are determined by the server 130 respective of the type of the security incident. The actions may also be determined by the server 130 respective of the type of the network 120 and the type of the security incident. The actions may be, for example, termination of a process, removal of content, redirection of network connectivity, generation of an ad-hoc firewall protection, block of host connection, execution of one or more cleaning and detection tools, etc.

Upon completion of the actions the TA 115 is terminated by the server 130. According to another exemplary embodiment, the TA 115 is configured by the server 130 to continuously send additional metadata respective of the security incident and only upon determination that the security incident is terminated the server 130 terminates the TA 115. According to one exemplary embodiment, the system 100 further comprises at least one database 140. The database 140 is configured to store, for example, metadata collected from the user devices 110, expected and actual behavior patterns, metadata received from the TA 115, etc.

Figure 2:
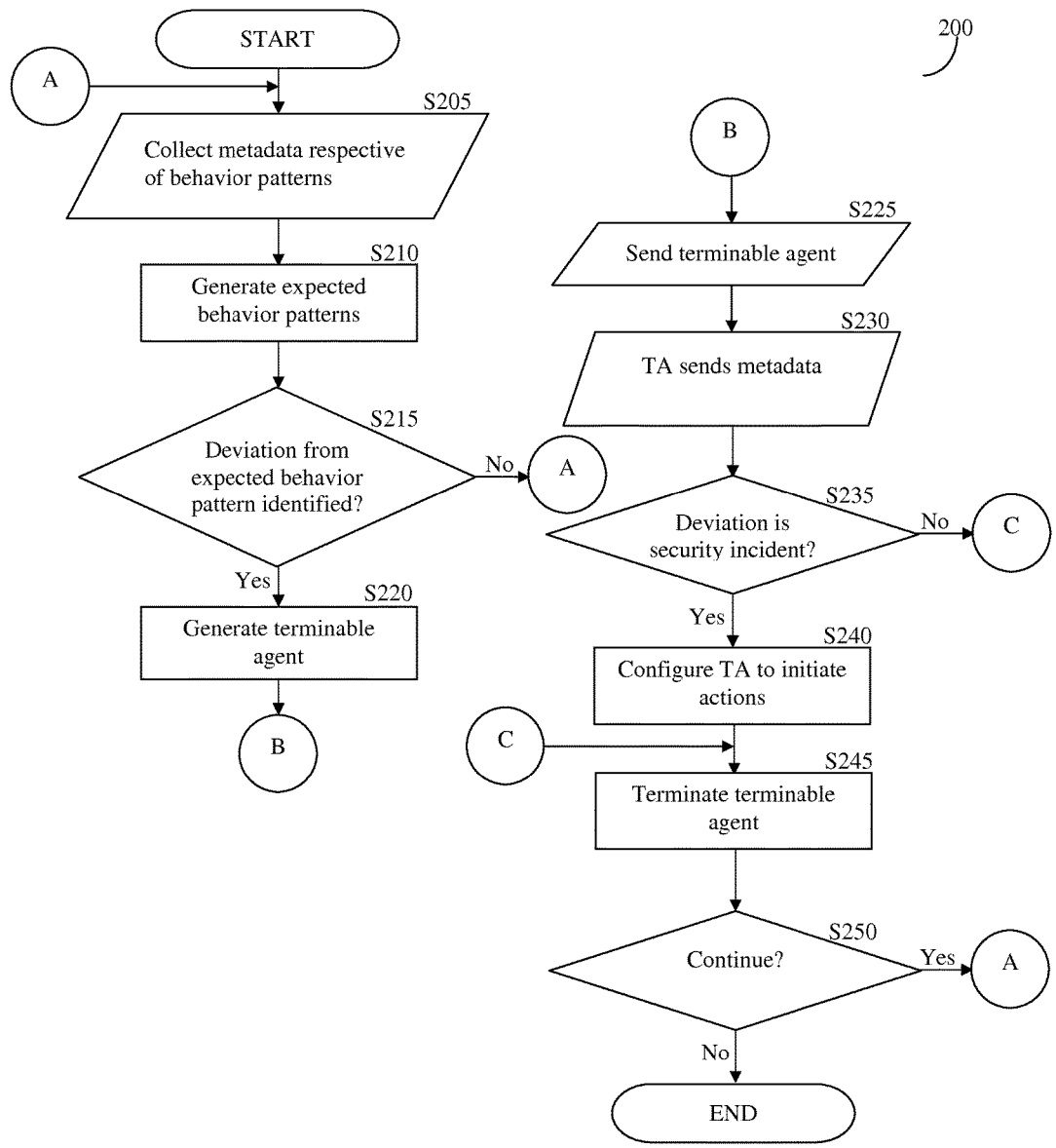
FIG. 2 is a flowchart describing a method for monitoring security incidents in a computerized environment according to an exemplary embodiment.

FIG. 2 is an exemplary and non-limiting flowchart 200 describing a method for monitoring and preventing security incidents in a computerized environment according to an embodiment. The operation starts when metadata respective of behavior patterns of one or more user devices 110 is collected (S205). One or more expected behavior patterns are generated respective of the metadata (S210). It is checked whether a deviation from the one or more expected behavior patterns is detected in at least one user device of the user devices 110 (S215) and if so, execution continues with S220; otherwise, execution continues with S205. According to another exemplary embodiment (not shown), the operation starts when a notification of a deviation from common/expected behavior is received from, for example, an external detection system and the operation continues with S220. In S220, at least one terminable agent such as the TA 115 is generated respective of the deviation. In S225, the TA 115 is sent to a source in which the deviation is detected, for example, the user device 110-N. In S230, the TA 115 is configured to send metadata respective of the deviation. In S235, it is checked whether the deviation is a security incident and if so, execution continues with S240; otherwise, execution continues with S245. In S240, the TA 115 is configured to initiate one or more actions respective of the security incident. In S245, the TA 115 is terminated. In S250, it is checked whether to continue with the operation and if so, execution continues with S205; otherwise, execution terminates.

The principles of the disclosed embodiments are implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and exemplary embodiments of the present disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A method of generating a response to a security incident occurring in a computerized environment that comprises one or more user devices, the method comprising:
   detecting, by a computerized device, at least one deviation from an expected behavior of at least one of the one or more user devices;
   generating, by the computerized device in response to the computerized device detecting the at least one deviation from an expected behavior of at least one of the one or more user devices, at least one terminable agent;
   sending, by the computerized device, the at least one terminable agent to the at least one user device in which the at least one deviation is detected;
   configuring, by the computerized device, the at least one terminable agent to send metadata respective of the at least one deviation;
   receiving, from the at least one terminable agent, the metadata;
   determining, by the computerized device, whether the at least one deviation is a security incident respective of the metadata;
   configuring, by the computerized device, the at least one terminable agent to initiate at least one action upon determination that the at least one deviation is a security incident, the at least one action being determined by the computerized device respective of a type of the security incident; and
   terminating, by the computerized device, the at least one terminable agent upon determination that the security incident is cleared.

2. The method of claim 1, further comprising:
  detecting the at least one deviation from the expected behavior of at least one of the one or more user devices, the detecting comprising:
  receiving, by the computerized device, at least one notification of the at least one deviation from the expected behavior of at least one of the one or more user devices.

3. The method of claim 1, further comprising:
  detecting the at least one deviation from the expected behavior of at least one of the one or more user devices, the detecting comprising:
  collecting, by the computerized device, metadata respective of behavior patterns of the one or more user devices; and
  generating, by the computerized device, expected behavior patterns of each of the one or more user devices.

4. The method of claim 1, wherein the configuring the at least one terminable agent to initiate at least one action upon determination that the at least one deviation is a security incident comprises:
  configuring the at least one terminable agent to terminate a process in the at least one user device.

5. The method of claim 1, wherein the configuring the at least one terminable agent to initiate at least one action upon determination that the at least one deviation is a security incident comprises:
  configuring the at least one terminable agent to remove content from the at least one user device.

6. The method of claim 1, wherein the configuring the at least one terminable agent to initiate at least one action upon determination that the at least one deviation is a security incident comprises:
  configuring the at least one terminable agent to redirect network connectivity.

7. The method of claim 1, wherein the configuring the at least one terminable agent to initiate at least one action upon determination that the at least one deviation is a security incident comprises:
  configuring the at least one terminable agent to generate a firewall protection.

8. The method of claim 1, wherein the configuring the at least one terminable agent to initiate at least one action upon determination that the at least one deviation is a security incident comprises:
  configuring the at least one terminable agent to block a host connection.

9. The method of claim 1, wherein the configuring the at least one terminable agent to initiate at least one action upon determination that the at least one deviation is a security incident comprises:
  configuring the at least one terminable agent to execute a cleaning and detection tool.

10. The method of claim 1, wherein the expected behavior pattern is one of multiple expected behavior patterns generated respective of collected metadata respective of behavior patterns of the one or more user devices.

11. The method of claim 1, the terminable agent requiring no configurations from the at least one user device.

12. An apparatus for generating a response to a security incident occurring in a computerized environment that comprises one or more user devices, the apparatus comprising:
  one or more processors; and
  memory storing executable instructions that, when executed by the one or more processors, causes the one or more processors to:
  detect at least one deviation from an expected behavior of at least one of the one or more user devices;
  generate, in response to the apparatus detecting the at least one deviation from an expected behavior of at least one of the one or more user devices, at least one terminable agent;
  send the at least one terminable agent to the at least one user device in which the at least one deviation is detected;
  configure the at least one terminable agent to send metadata respective of the at least one deviation;
  receive, from the at least one terminable agent, the metadata;
  determine whether the at least one deviation is a security incident respective of the metadata;
  configure the at least one terminable agent to initiate at least one action upon determination that the at least one deviation is a security incident, the at least one action being determined respective of a type of the security incident; and
  terminate the terminable agent upon determination that the security incident is cleared.

13. The apparatus of claim 12, wherein the memory stores further executable instructions that, when executed by the one or more processors, causes the one or more processors to:
  detect the at least one deviation from the expected behavior of at least one of the one or more user devices by receiving at least one notification of the at least one deviation from the expected behavior of at least one of the one or more user devices.

14. The apparatus of claim 12, wherein the memory stores further executable instructions that, when executed by the one or more processors, causes the one or more processors to:
  detect the at least one deviation from the expected behavior of at least one of the one or more user devices by:
  collecting, by the computerized device, metadata respective of behavior patterns of the one or more user devices; and
  generating, by the computerized device, expected behavior patterns of each of the one or more user devices.

15. The apparatus of claim 12, wherein to configure the at least one terminable agent to initiate at least one action upon determination that the at least one deviation is a security incident comprises to configure the at least one terminable agent to terminate a process in the at least one user device.

16. The apparatus of claim 12, wherein to configure the at least one terminable agent to initiate at least one action upon determination that the at least one deviation is a security incident comprises to configure the at least one terminable agent to remove content from the at least one user device.

17. The apparatus of claim 12, wherein to configure the at least one terminable agent to initiate at least one action upon determination that the at least one deviation is a security incident comprises to configure the at least one terminable agent to block a host connection.

18. The apparatus of claim 12, wherein to configure the at least one terminable agent to initiate at least one action upon determination that the at least one deviation is a security incident comprises to configure the at least one terminable agent to execute a cleaning and detection tool.

19. One or more computer readable storage media devices storing a program for executing a method of generating a response to a security incident occurring in a computerized environment that comprises one or more user devices, the method comprising:

detecting, by a computerized device, at least one deviation from an expected behavior of at least one of the one or more user devices;

generating, by the computerized device in response to the computerized device detecting the at least one deviation from an expected behavior of at least one of the one or more user devices, at least one terminable agent;

sending, by the computerized device, the at least one terminable agent to the at least one user device in which the at least one deviation is detected;

configuring, by the computerized device, the at least one terminable agent to send metadata respective of the at least one deviation;

receiving, from the at least one terminable agent, the metadata;

determining, by the computerized device, whether the at least one deviation is a security incident respective of the metadata;

configuring, by the computerized device, the at least one terminable agent to initiate at least one action upon determination that the at least one deviation is a security incident, the at least one action being determined by the computerized device respective of a type of the security incident; and terminating, by the computerized device, the at least one terminable agent upon determination that the security incident is cleared.

20. The one or more computer readable storage media devices of claim 19, wherein the configuring the at least one terminable agent to initiate at least one action upon determination that the at least one deviation is a security incident comprises:

configuring the at least one terminable agent to perform at least one of:
terminating a process in the at least one user device,
removing content from the at least one user device,
redirecting network connectivity,
generating a firewall protection,
blocking a host connection, and
executing a cleaning and detection tool.

* * * * *